United States Patent [19]
Hull et al.

[11] Patent Number: 5,501,028
[45] Date of Patent: Mar. 26, 1996

[54] FISHING ROD HOLDER WITH BITE SIGNALING MEANS

[76] Inventors: Harold L. Hull, 401 Canyon Way #43, Sparks, Nev. 89434; Daniel E. Webb, 1905 Citron St., Reno, Nev. 89512

[21] Appl. No.: 390,657

[22] Filed: Feb. 17, 1995

[51] Int. Cl.$^6$ .................................................. H01K 97/12
[52] U.S. Cl. ........................................ 43/17; 43/21.2
[58] Field of Search ............................... 43/17, 21.2

[56] References Cited

U.S. PATENT DOCUMENTS

| | | | |
|---|---|---|---|
| 3,058,250 | 10/1962 | Thomas | 43/17 |
| 3,285,360 | 11/1966 | Wetsch | 43/17 |
| 3,359,673 | 12/1967 | Roemer | 43/17 |
| 3,645,028 | 2/1972 | Rayburn | 43/17 |
| 3,750,918 | 8/1973 | Jensen | 43/21.2 X |
| 3,782,613 | 1/1974 | Davis | 224/5 E |
| 3,862,508 | 1/1975 | Morgan | 43/17 |
| 4,004,365 | 7/1975 | Manchester | 43/17 |
| 4,092,795 | 6/1978 | Bryant | 43/17 |
| 4,125,957 | 11/1978 | Cunningham | 43/17 |
| 4,372,072 | 2/1983 | Comeau | 43/21.2 |
| 4,455,779 | 6/1984 | Cosic | 43/17 |
| 4,506,468 | 3/1985 | Willite | 43/17 |
| 4,510,709 | 4/1985 | Melcher | 43/17 |
| 4,641,453 | 9/1985 | Roberts | 43/17 |
| 4,651,460 | 3/1987 | Sykes | 43/17 |
| 4,746,253 | 5/1988 | Simmons | 43/17 |
| 4,807,384 | 2/1989 | Roberts | 43/17 |
| 4,811,512 | 3/1989 | Amos | 43/17 |
| 5,054,737 | 10/1991 | Delancey | 43/21.2 X |

*Primary Examiner*—P. Austin Bradley
*Assistant Examiner*—Jeanne M. Elpel

[57] ABSTRACT

A combination fishing rod holder and bite indicator for use by a bank fisherman and includes a probe which is inserted into the sand or ground and is so constructed as to hold the fishing rod in multiple positions of choice such as more vertical than horizontal and when a fish bites, a ratcheting apparatus allows the pole to assume a more horizontal position to indicate that a fish bite has occurred.

4 Claims, 3 Drawing Sheets

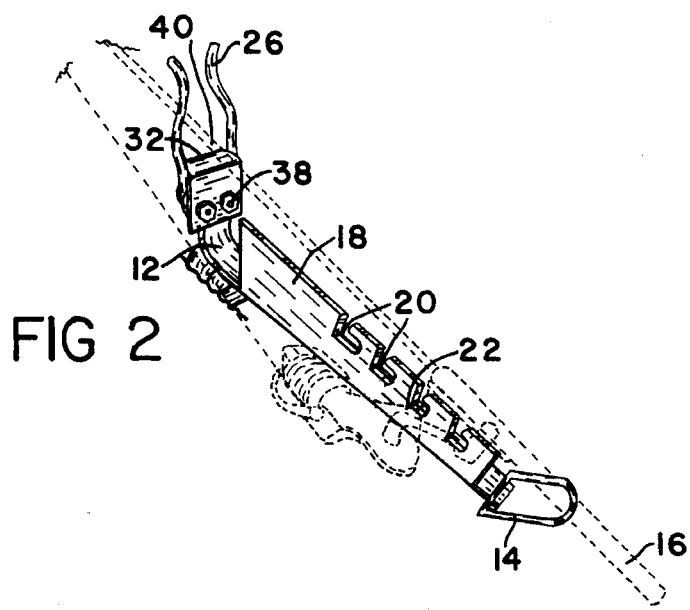
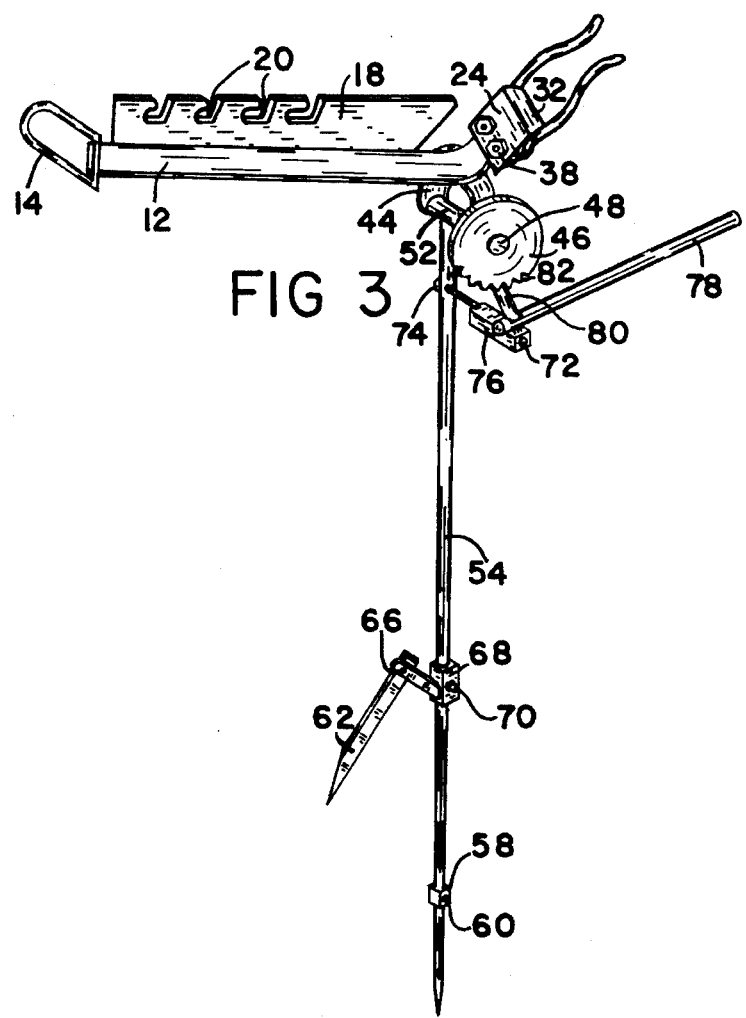

FISHING ROD HOLDER WITH BITE SIGNALING MEANS

FIELD OF THE INVENTION

This invention relates to fishing rod holders but more particularly to fishing rod holders having bite signaling means.

BACKGROUND OF THE INVENTION

In the past, many attempts have been made to provide a fishing rod holder which signals the fisherman that he has had a bite from a fish, such as U.S. Pat. Nos. 4,811,512, 4,807,384, 4,641,453, 4,455,779, 4,372,072, 4,004,365, 3,782,613, 3,645,028, 3,359,673 and 3,058,250 all of which perform the above described function, however each of these references include electrically activated switch means which when actuated produce an audible sound such as a horn, whistle, bell or the like and each must have a power source such as a battery.

U.S. Pat. Nos. 4,651,460 and 4,746,253 include a visual signaling means such as a flag or an elongated flexible member, each of which having a first and second position.

These devices are functional and complete in themselves, however, none of these references teach an apparatus such as the present invention which provides a fishing rod holder having a unique visual signaling means.

SUMMARY OF THE INVENTION

It is therefore a primary object to provide a fishing rod holder which visually signals to the fisherman that he has had a bite from a fish.

Another object is to provide an apparatus which allows the fishing rod to assume multiple positions producing a different visual plane when compared to the horizon.

Still another object is to provide a rod holder which has multiple recesses to accept the fishing reel attachment shaft.

Yet another important object is to provide a spring loaded quick release mechanism to release the forward held portion of the rod handle.

Another object is to include in the apparatus a circular member having multiple saw teeth located substantially about at least one third of its outer circumference which cooperates with a pawl to allow the rod to "tip" toward the body of water to indicate that a fish has taken the bait.

Yet another object is to provide an elongated mounting probe which may be inserted into the sand or ground to support the apparatus and is adjustable in height.

Still another object is to provide stabilizing means, if so desired, so that the wind cannot move the pole and cause a false indication of a fish bite.

Other objects and advantages will become obvious when taken into consideration with the following drawing and specifications.

BRIEF DESCRIPTION OF THE DRAWINGS

FIG. 2, is a perspective backside view of our fishing rod holder when supporting a fishing rod as shown in ghost lines.

FIG. 3, is a perspective view shown in a second position.

DETAILED DESCRIPTION OF THE DRAWINGS

Figure 1:
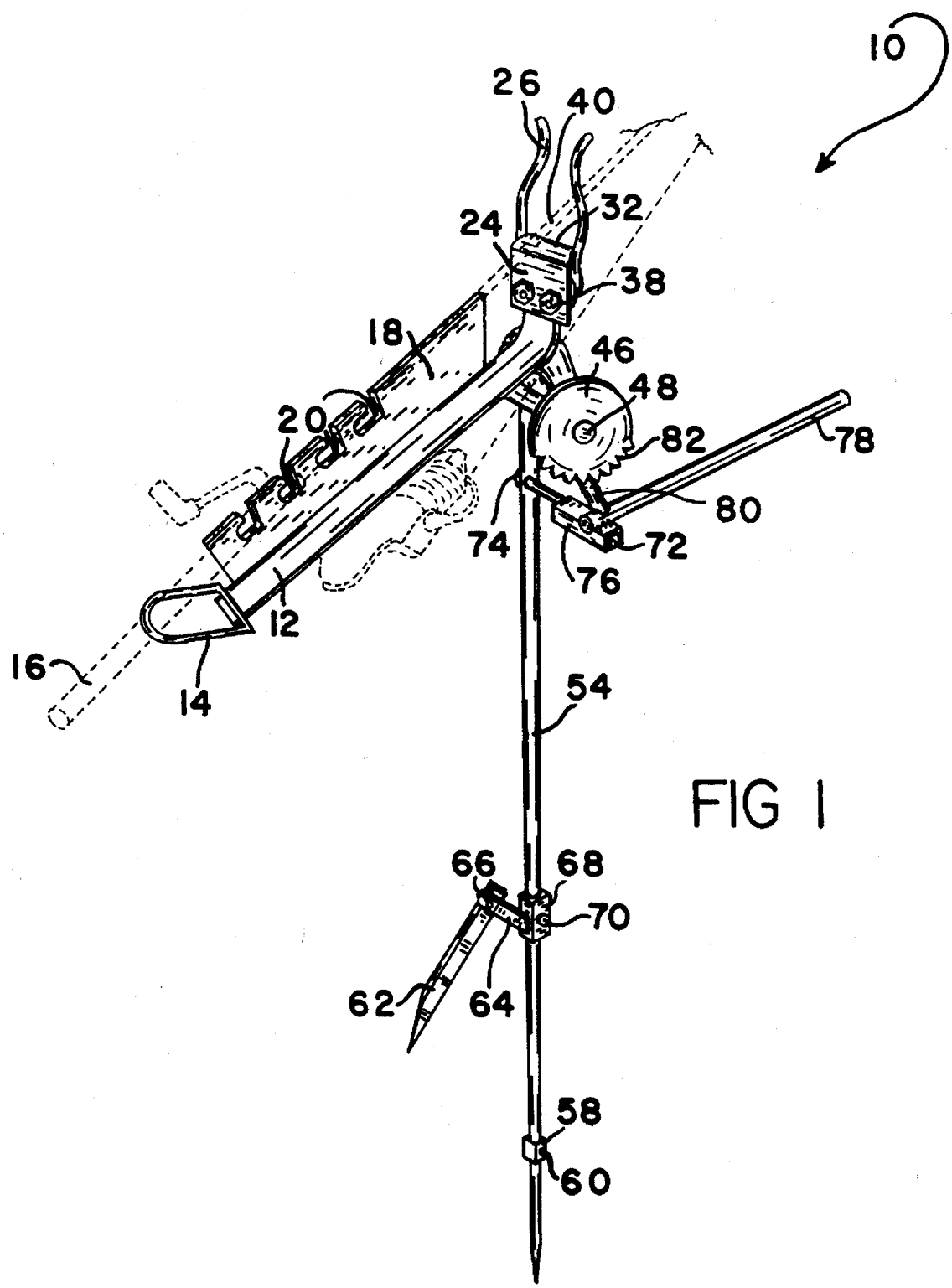
FIG. 1, is a perspective frontal view of our fishing rod holder when supporting a fishing rod as shown in ghost lines.

Referring now in detail to the drawings wherein like characters refer to like elements throughout the various drawings, in FIG. 1, 10 is an overview of the fishing rod holder while 12 is an elongated support plate having on one of its ends a substantially rectangular shaped member 14 attached by means such as welding (not shown), which is of a size and shape to accept and support a fishing pole handle 16. 18 is an elongated side plate which is attached along one side to support plate 12 by means such as welding (not shown) and includes multiple substantially L-shaped recesses 20 which are of a shape and size to accept and support a fishing reel attachment shaft 22 as shown in FIG. 2.

Figure 4:
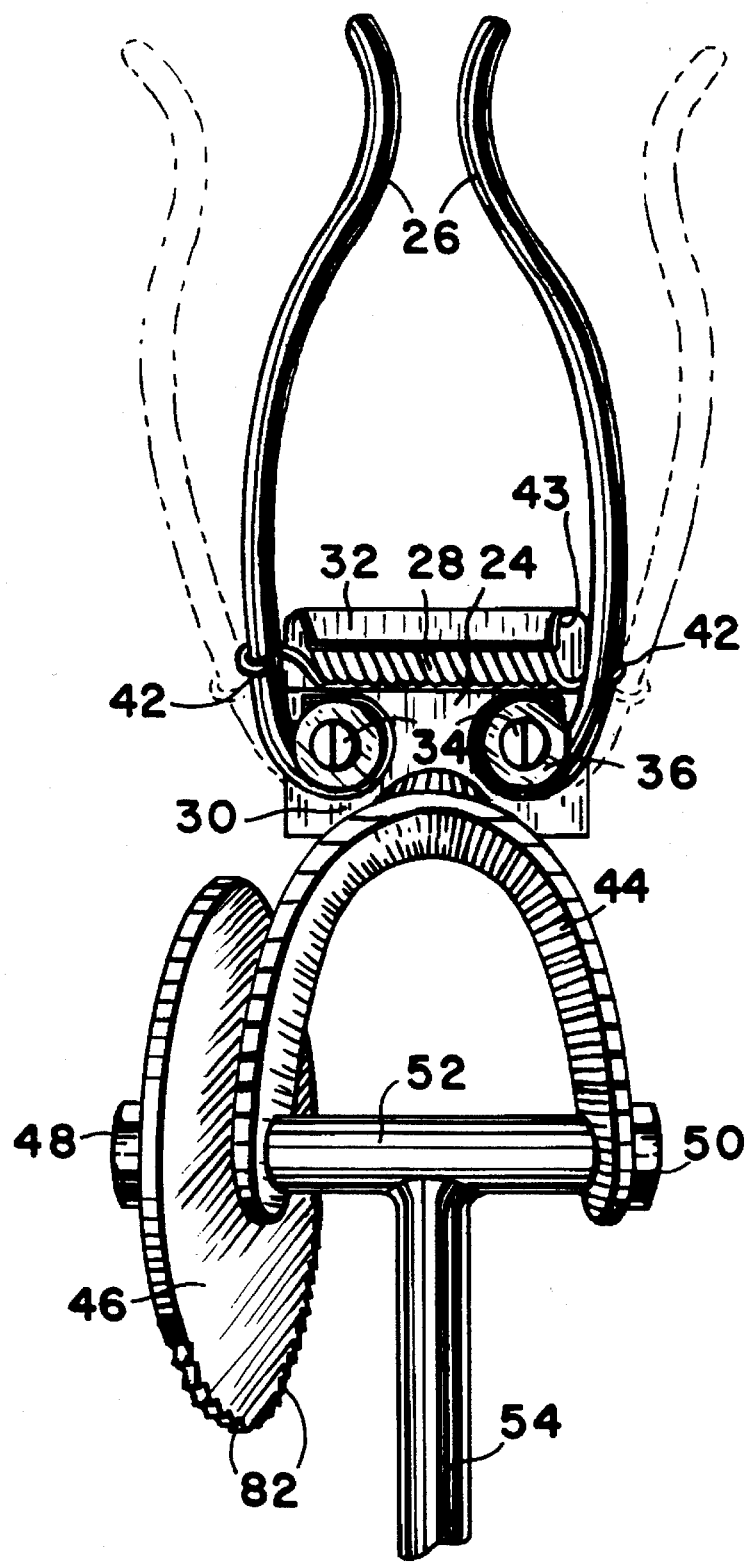
FIG. 4, is an enlarged backside view of a spring loaded quick release mechanism having its second position shown in ghost lines.

Support plate 12 has on its opposite end, a spring loaded quick release mechanism 24 attached by means such as welding (not shown). Mechanism 24 includes at least two elongated gripping members 26, a resilient spring 28, a rectangular spacer plate 30, and a spring protector shield 32 as shown in FIG. 4. Screw 34, washer 36 and nut 38 cooperate together to capture and secure elongated gripping members 26, spacer plate 30 and protector shield 32 in a working relationship.

Gripping member 26 being formed substantially in a circular shape on one of its ends, which allows screw 34 to be captured there within. Gripping member 36 has its opposite end substantially in the form of an "S" and gripping members 26 having means to attach resilient spring 28, such as a hole 42, substantially on its circular end. Gripping members 26 have a first and second position and when in their first position are held in place by resilient spring 28, whereby the forward portion of a fishing rod 40 is retained and held in a secure manner between gripping members 26. When gripping members 26 are pulled apart and away from each other, they assume a second position (as shown by ghost lines in FIG. 4) whereby the forward portion of a fishing rod 40 can be removed.

Spring protector shield 32 is substantially in the shape of a rectangle with one of its ends forming a half-circle which provides a protective lip 43 which retains resilient spring 28 in a secure manner, and spring protector shield 32 having tapered sides so as to provide space and a positive stop for gripping members 26 when in their first position.

The opposite end of elongated support plate 12 (which has release mechanism 24 attached thereto) includes on its bottom side means to fixidly attach substantially U-shaped member 44 with U-shaped member 44 having one of its legs fixidly attached by means such as welding (not shown) to a circular member 46.

The legs of U-shaped member 44 and substantially the center section of circular member 46, include a bore (not shown) to accept a bolt 48 and nut 50 as more clearly shown in FIG. 4.

Elongated support plate 12, rectangular member 14, side plate 18, release mechanism 24, U-shaped member 44, circular member 46, bolt 48 and nut 50 cooperate in a fixed relationship, whereby, when bolt 48 is journaled thru cross member 52, a pivotable arrangement is thereby provided.

Cross member 52 is fixidly attached by means such as welding (not shown) to mounting probe 54 which may be telescopic and adjustable in height by a locking means consisting of a collet 58 and screw 60, as shown in the preferred embodiment.

62 is a stabilizer assembly substantially in the form of a stake, while 64 is an elongated attachment member which has one of its ends fixidly attached to stabilizer assembly 62 by a screw 66 and nut (not shown). Member 64 having its opposite end attached to collet 68 by means such as welding (not shown) and collet 68 being adjustable in height by screw 70, whereby providing means to stabilize mounting probe 54 when the stabilizer assembly 62 is inserted into the ground (not shown).

Mounting probe 54 includes a horizontal bore (not shown) which is located substantially near cross member 52, which accepts screw 72 and is held in a fixed relationship by nut 74, screw 72 being of a sufficient length to allow a pivotable member 76 to be journaled thereto. Pivotable member 76 has means to attach (such as by welding, not shown) a circular rod 78 which acts as a weight mechanism with circular rod 78 having on its attached end, means to attach a pawl 80 by means such as welding (not shown), whereby providing pivotable member 76, circular rod 78 and pawl 80 means to rotate 360 degrees.

Circular member 46 includes teeth 82 substantially around at least one third of its outer circumference, whereby when pawl 80 is captured by one of teeth 82, the entire fishing rod holder and fishing rod assume a first position as shown in FIG. 1, however, when a fish tugs on the fishing line, pressure from the forward portion of the fishing rod 40 exerts enough force to cause pawl 80 to jump from one tooth 82 to the following tooth 82, whereby alerting the fisherman that he has had a bite from a fish. The fisherman can actually count how many bites he has received by counting how many teeth 82 have been jumped. When consecutive bites occur, the fishing rod holder may assume a second position as depicted in FIG. 3.

It will now be seen that we have provided a fishing rod holder which includes bite signaling means.

It will also be seen that we have provided a fishing rod holder which is capable of multiple positions producing a different visual plane when compared to the horizon.

It will further be seen that we have provided a fishing rod holder which can accept a variety of different fishing reels as multiple recesses are provided which accept the attachment shaft of a fishing reel.

It will further be seen that we have provided a spring loaded quick release mechanism to release the forward held portion of the rod handle.

It will also be seen that we have provided a fishing rod holder which includes a circular member having teeth and a pawl which cooperate together to allow the rod to "tip" toward the body of water to indicate that a fish has taken the bait.

It will also be seen that we have provided the fishing rod holder with a mounting probe which can secure the holder when positioned in the ground.

We also have provided a rod holder which is adjustable in height.

It will further be seen that we have provided means to stabilize the rod holder from twisting or turning.

Although the invention has been shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus's.

Having described our invention, what we claim as new and desire to secure by letters patent is:

1. A combination fishing rod holder and bite signaling means comprising; support means, said support means being substantially an elongated probe having a first and second end, said first end being capable of being forced into a supporting surface, a tubular cross member having a length longer than its girth, said tubular cross member being fixidly attached to said second end of said support means forming a T, a U-shaped member, said U-shaped member having substantially parallel legs, said legs having their distal ends spaced apart at a greater distance than said length of said cross member, said distal ends each having a bore substantially in alignment with said cross member, said bore being of a size substantially equal to an inside diameter of said cross member, a circular member substantially in the form of a flat washer having an outer circumference, said circular member having a bore of a size substantially equal to an inside diameter of said cross member, said circular member having multiple saw teeth on its said outer circumference, said circular member being fixidly attached to an outer surface of one of said parallel legs of said U-shaped member with its said bore in alignment with said bore of said U-shaped member, a mounting bolt, said mounting bolt being of a length to pivotably mount said U-shaped member with said circular member to said cross member, a substantially elongated rectangular support plate having a first and second end, said first end being fixidly attached to a common leg of said U-shaped member, said first end supporting an uprising fixidly attached to a fishing rod support mechanism, said mechanism comprising; two uprising fingers having first and second ends with said first ends being pivotably mounted to said first end of said support plate, a spring, said second ends being biased toward each other by said spring, said fingers having a first and second position, stop means to allow said fingers to assume said first position, said first position being closed to capture a rod portion of said fishing rod, said second position being open to allow said rod portion of said fishing rod to be released; a fishing rod handle support means, said support being fixidly attached to said second end of said support plate, said fishing rod handle support means releasably capturing a handle portion of said fishing rod, said support plate having an uprising portion on one of its elongated sides, said uprising portion having multiple recesses to accept a crank handle of said fishing rod, said probe supporting a ratcheting structure comprising; a horizontal support leg fixidly attached at one of its ends to said probe at a point below said circular member having saw teeth, said support leg supporting an L-shaped member having a short leg and a long leg pivotably mounted to the distal end of said support leg, said short leg being in communication with said saw teeth of said circular member, said long leg of said L-shaped member acting as a weight to keep said short leg of said L-shaped member in register with said saw teeth, whereby;

when said fishing rod is placed in said fishing rod holder with the handle portion in said handle support means and said crank handle of said fishing rod is placed in one of said multiple recesses and said rod portion of said fishing rod is placed between said uprising fingers and said ratcheting structure is set into a position wherein said fishing rod is held in a plane more vertical than horizontal, and said probe is forced into said supporting surface in an upright position, when a fish bites and disturbs the fishing line of said fishing pole the tip of said fishing pole is pulled and said ratcheting structure ratchets one saw-tooth and said plane of said fishing rod assumes a more horizontal position to indicate a bite.

2. The combination fishing rod holder and bite signaling means of claim 1 in which said probe is telescopic.

3. The combination fishing rod holder and bite signaling means of claim 1 in which said probe includes a second support means, said second support means being removably affixed to substantially the said first end of said probe, said second support means being capable of being forced into a supporting surface.

4. The combination fishing rod holder and bite signaling means of claim 1 in which the rod holder and bite signaling means are fabricated from metal.

* * * * *